US008029349B2

(12) United States Patent
Lind

(10) Patent No.: US 8,029,349 B2
(45) Date of Patent: Oct. 4, 2011

(54) NETWORKED GAMING SYSTEM WITH SECONDARY BONUS GAME

(75) Inventor: Jefferson C. Lind, Austin, TX (US)

(73) Assignee: Multimedia Games, Inc., Austin, TX (US)

( * ) Notice: Subject to any disclaimer, the term of this patent is extended or adjusted under 35 U.S.C. 154(b) by 287 days.

(21) Appl. No.: 11/268,322

(22) Filed: Nov. 7, 2005

(65) Prior Publication Data

US 2007/0105615 A1 May 10, 2007

(51) Int. Cl.
*A63F 13/00* (2006.01)

(52) U.S. Cl. ........................................ 463/16; 463/17

(58) Field of Classification Search .................. 463/16, 463/17

See application file for complete search history.

(56) References Cited

U.S. PATENT DOCUMENTS

| | | | | |
|---|---|---|---|---|
| 5,116,055 | A | 5/1992 | Tracy | |
| 5,472,196 | A | 12/1995 | Rusnak | |
| 5,885,158 | A | 3/1999 | Torango et al. | |
| 6,234,897 | B1 * | 5/2001 | Frohm et al. | 463/20 |
| 6,585,589 | B2 | 7/2003 | Okuniewicz | |
| 6,988,946 | B2 * | 1/2006 | Michaelson et al. | 463/17 |
| 7,137,889 | B1 * | 11/2006 | Luciano, Jr. | 463/25 |
| 7,320,641 | B2 * | 1/2008 | Luciano, Jr. | 463/25 |
| 2001/0009865 | A1 * | 7/2001 | Demar et al. | 463/20 |
| 2001/0036864 | A1 | 11/2001 | Melas | |
| 2003/0036427 | A1 | 2/2003 | Brandstetter et al. | |
| 2003/0060256 | A1 | 3/2003 | Joshi | |
| 2003/0060264 | A1 | 3/2003 | Chilton et al. | |
| 2003/0083943 | A1 | 5/2003 | Adams et al. | |
| 2003/0087691 | A1 * | 5/2003 | Kiely et al. | 463/25 |
| 2003/0100361 | A1 | 5/2003 | Sharpless et al. | |
| 2003/0104853 | A1 * | 6/2003 | Tessmer et al. | 463/16 |
| 2003/0157979 | A1 | 8/2003 | Cannon et al. | |
| 2003/0186739 | A1 | 10/2003 | Paulsen et al. | |
| 2004/0014515 | A1 | 1/2004 | Tracy et al. | |
| 2004/0072619 | A1 | 4/2004 | Brosnan et al. | |
| 2004/0106454 | A1 | 6/2004 | Walker et al. | |
| 2004/0166922 | A1 * | 8/2004 | Michaelson et al. | 463/20 |
| 2004/0192429 | A1 | 9/2004 | Moody | |

(Continued)

OTHER PUBLICATIONS

International Search Report for PCT/US2006/41517 dated Mar. 6, 2007 (3 Pages).

(Continued)

*Primary Examiner* — James McClellan

(74) *Attorney, Agent, or Firm* — Nathan H. Calvert; Russell D. Culbertson; The Culbertson Group, P.C.

(57) ABSTRACT

A method includes receiving a game play input preferably in a gaming network. This game play input specifies a wager in a primary game in which a player is participating through the network, and is typically entered through a player station connected in the network. A secondary game play is generated in response to the game play input. This generation of the secondary game play is separate from any actions taken in the gaming network in connection with the primary game in response to the game play input. The secondary game play includes one or more entries in a secondary game that is distinct from the primary game, and the number of entries included in the secondary game play is determined by the wager in the primary game. Each entry included in the secondary game play is associated with a chance in the secondary game and is ultimately analyzed to identify a result of the secondary game play for the secondary game. This secondary game result may then be presented to the player preferably at the same player station at which the game play input was made.

13 Claims, 4 Drawing Sheets

U.S. PATENT DOCUMENTS

| | | | | |
|---|---|---|---|---|
| 2004/0198487 | A1 | 10/2004 | Schneider | |
| 2004/0235554 | A1 | 11/2004 | DeFrees-Parrott et al. | |
| 2005/0054429 | A1 * | 3/2005 | Baerlocher et al. | 463/25 |
| 2005/0221881 | A1 | 10/2005 | Lannert et al. | |
| 2007/0060247 | A1 * | 3/2007 | Low et al. | 463/16 |

OTHER PUBLICATIONS

Written Opinion of the International Search Authority (PCT Rule 43bis. 1) for PCT/US2006/41517 dated Mar. 6, 2007 (4 Pages).

* cited by examiner

NETWORKED GAMING SYSTEM WITH SECONDARY BONUS GAME

TECHNICAL FIELD OF THE INVENTION

This invention relates to gaming machines and gaming systems that may include a number of networked gaming machines. More particularly, the invention relates to a gaming system that provides a secondary game to one or more gaming machines concurrently with one or more primary games that may be played at the gaming machines. The invention includes gaming methods, gaming apparatus, and program products.

BACKGROUND OF THE INVENTION

Modem gaming systems commonly include a number of gaming machines (hereinafter referred to as "player stations") connected across a communications network with one or more central data processing devices. Some gaming systems even have several different layers of central processing devices. For example, each one of several different gaming facilities may have a number of player stations connected for communications with a respective local area server, and the local area servers at the different gaming facilities may be connected for communication with another server.

There are a number of different functions that may be carried out in these gaming system networks using one or more layers of central data processing devices. For example, an electronic lottery system may use a central data processing device to store a file containing a number of electronic lottery records, and may distribute electronic lottery records or information from those records to the various player stations connected in the network. U.S. Pat. No. 6,733,385 discloses an example of an electronic lottery gaming system in which lottery result information is communicated over a network to the various player stations included in the network. Electronic bingo gaming systems may also be implemented with one or more layers of central data processing devices. Some electronic bingo gaming systems include a number of player stations from which players may submit requests to enter a bingo game, and may also include a central server that collects these game play requests and conducts bingo games to identify results which are then distributed back to the appropriate player stations in the network. U.S. patent application publication 2004-0152499-A1 discloses an example of such a bingo gaming system. Central data processing devices may also be used to implement progressive games in which progressive prizes are determined based upon wagers made at a number of different player stations in the network. U.S. patent application publication 2002-0132666-A1 shows another example of a gaming system network using one or more central data processing devices. In this example, the network implements a player account system for maintaining player accounts from which wagers are withdrawn and to which winnings are credited. A player tracking system or player club system may also be implemented in a gaming system network. Gaming networks may also be implemented simply for providing centralized monitoring and control for a number of different player stations.

Gaming system networks are commonly proprietary to a single player station provider. Also, a gaming facility such as a casino may contain player stations provided by different providers and operating on separate gaming system networks. Thus, a first player station at a casino may be connected in a first gaming system network, and another player station right next to the first player station may be connected in an entirely separate gaming system network. In these situations the player stations themselves are not only competing for players, but also the different networks are competing for players. Even where a given gaming facility includes only a single network of player stations, and all player stations at that facility are connected in that network, an adjacent gaming facility may include one or more separate gaming system networks. In these cases, the neighboring gaming system networks are essentially in competition for players.

Due to the competition between gaming system networks, it is desirable to have some way to make the player stations in a given network more attractive to potential players. Player station providers have traditionally tried to attract players by consistently introducing new and more exciting game presentations. "Game presentation" is used here and throughout this disclosure to refer to all of the graphic displays and mechanisms used by a player station in the course of receiving a wager and other player inputs, and showing the result of play at the player station for a given game. Gaming system operators try to have the most popular game presentations at player stations in their network in an effort to attract players to the network, and to retain players in the network.

SUMMARY OF THE INVENTION

The present invention provides methods and systems for encouraging play at a player station. In particular, the present invention includes a method and system for providing a secondary game that may be played on any number of player stations in a given network regardless of the respective primary games that may be available through the player stations connected in the network. The present invention also encompasses program products for providing a secondary game through a player station.

One method according to the invention includes receiving a game play input preferably in a gaming network. This game play input specifies a wager in a primary game in which a player is participating through the network, and is typically entered through a player station connected in the network. In response to the game play input, this illustrative method includes generating a secondary game play. This generation of the secondary game play is separate from any actions taken in the gaming network in connection with the primary game in response to the game play input. The secondary game play includes one or more entries in a secondary game that is distinct from the primary game, and the number of entries included in the secondary game play is determined by the wager in the primary game. Each entry included in the secondary game play is associated with a chance in the secondary game and is ultimately analyzed to identify a result of the secondary game play for the secondary game. This secondary game result may then be presented to the player preferably at the same player station at which the game play input was made.

As used in this disclosure and the accompanying claims, the reference to the secondary game being "distinct" from the primary game means that the respective results in the primary game and secondary game are identified in separate processes. Although the primary game and secondary game are distinct, the two games are conducted in parallel with each other to identify respective results in response to the game play input in the primary game. Also, since the wager for the primary game determines the number of chances a player receives in the secondary game, the probability of winning in the secondary game may be readily normalized as between the different wager levels that may be available in different primary games. That is, the number of chances in a given secondary game play may be determined consistently between different primary games so that each secondary game play provides the same number of chances in the secondary game per unit wager. The secondary game according to the invention may be readily associated with any primary game available in the gaming network, and probabilities of winning or losing in the secondary game per unit wager may remain consistent between the various primary games.

In one preferred form of the invention, each entry for a secondary game play comprises a respective ticket record assigned from a pool of ticket records. The pool of ticket records may remain fixed for each secondary game play and may be structured to provide the desired probabilities of winning any of the prizes available in the secondary game on any given entry in the secondary game. For example, the pool of ticket records from which records are drawn for each respective secondary game play may include ten million ticket records with prizes associated with only ten of the ticket records and no prize associated with each of the remaining ticket records. Thus, the probability of winning one of the prizes on a given entry in the secondary game is one in one million in this example.

A gaming system embodying the principles of the invention may include a player station through which a player may make the game play input and associated wager for a respective primary game. A primary game controller identifies a primary game result in response to the game play input. This primary game controller may be implemented at the player station itself or at one or more other devices in the gaming system. Regardless of how the primary game controller is implemented, the player station includes a display arrangement for presenting the primary game result at the player station. A secondary game controller is included in the gaming system for generating a respective secondary game play in response to the game play input. Each secondary game entry included in the secondary game play is analyzed by a game play interpreter to identify the result in the secondary game for the secondary game play.

One preferred program product embodying principles of the invention includes primary game program code, secondary game program code, and secondary game play interpreter program code all stored on one or more computer readable storage devices. The primary game program code is executable for identifying the primary game result in response to a respective one of the game play inputs entered through a respective player station. The secondary game program code is executable for generating a respective secondary game play in response to the game play input in the primary game. As discussed in connection with the method embodiment above, the secondary game play is correlated with the game play input in the primary game and includes one or more entries in the secondary game that is distinct from the respective primary game. Also as discussed above, the number of entries included in the secondary game play is determined by the wager in the primary game. The secondary game play interpreter program code is executable for analyzing each entry included in the secondary game play to identify the result of the secondary game play for the secondary game.

These and other advantages and features of the invention will be apparent from the following description of the preferred embodiments, considered along with the accompanying drawings.

DESCRIPTION OF PREFERRED EMBODIMENTS

Figure 1:
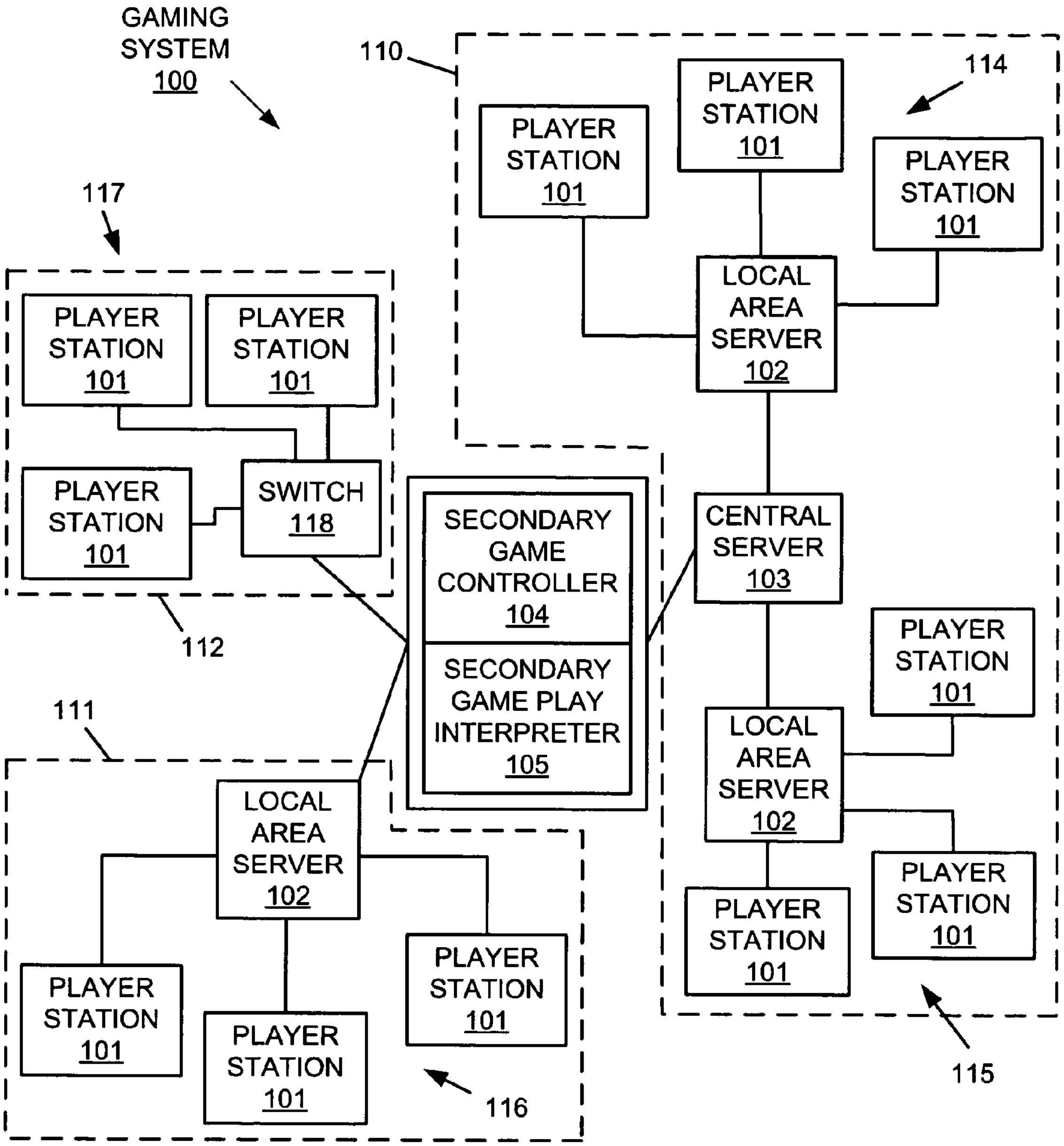
FIG. 1 is a high level diagrammatic representation of a gaming system embodying the principles of the present invention.

FIG. 1 shows a networked gaming system 100 embodying the principles of the present invention. Gaming system 100 includes three separate gaming networks, a first gaming network 110, a second gaming network 111, and a third gaming network 112. First gaming network 110 includes a number of player stations 101 operatively connected for communication with other gaming system devices. In particular, a first group 114 of player stations 101 is connected to communicate with a local area server 102, and a second group 115 of player stations 101 is connected to communicate with a separate local area server 102. Both of these local area servers 102 are connected for communication with a central server 103. Second gaming network 111 includes a separate group 116 of player stations 101 connected for communications with another local area server 102. Third gaming network 112 shown in FIG. 1 includes another group 117 of player stations 101 interconnected through a network switch 118.

According to the present invention, gaming system 100 also includes a secondary game controller 104 and a secondary game play interpreter 105 which, in this example system, are connected for communication with each of the three gaming networks. As will be described in more detail below with reference to FIG. 3 and to the flow diagram shown in FIG. 4, secondary game controller 104 functions to generate a respective secondary game play for a secondary game in response to each game play input entered through one of the player stations 101 in gaming system 100. Secondary game play interpreter 105 preferably analyzes the secondary game play generated in response to a respective game play input at a player station 101 to identify a result for the secondary game play. Ultimately, at least each winning result for the secondary game play is communicated to the respective player station 101 through which the respective game play input was entered.

Gaming system 100 in FIG. 1 is shown as an example to help illustrate the flexibility of the present invention for providing a secondary game. It should be noted that the three gaming networks 110, 111, and 112, shown in FIG. 1 are separate networks related only by secondary game controller 104 and secondary game play interpreter 105. The primary games offered on the different gaming networks 110, 111, and 112, may in fact be entirely different types of games, and the networks themselves may even be in different gaming jurisdictions operating under different regulatory environments. For example, gaming network 110 may comprise a bingo gaming system of the type disclosed in U.S. patent application publication 2004-0152499-A1 or an electronic lottery gaming system such as that shown in U.S. Pat. No. 6,733,385. Similarly, gaming network 111 may comprise a bingo gaming system for a given casino/gaming facility, or an electronic lottery gaming system. Alternatively, either or both of the gaming networks 110 and 111 may comprise networks in which the player stations 101 identify the results of play in a respective primary game, and the local area servers 102 (and central server 103 in the case of gaming network 110) do not participate in identifying primary game results. In these types of gaming networks, the local area servers 102 and central server 103 may provide accounting, player tracking, and/or system monitoring functions. It is also possible for a given one of the gaming networks 110 and/or 111 to provide two or more different types of games (for example, central determinant lottery and traditional stand alone slot or video poker games). The third gaming network 112 is included in FIG. 1 to illustrate that the present secondary game process may be used in connection with player stations that are not connected for network communications aside from communications with secondary game controller 104. The player stations 101 in group 117 may comprise player stations that each separately conduct a respective primary game and communicate with secondary game controller 104 and secondary game play interpreter 105 in connection with a secondary game according to the present invention. In the case of each network 110, 111, and 112, some component is provided for conducting a primary game so that primary game results may be displayed at the respective player stations 101, and secondary game controller 104 and secondary game play interpreter 105 are provided to implement a secondary game according to the present invention.

Figure 2:
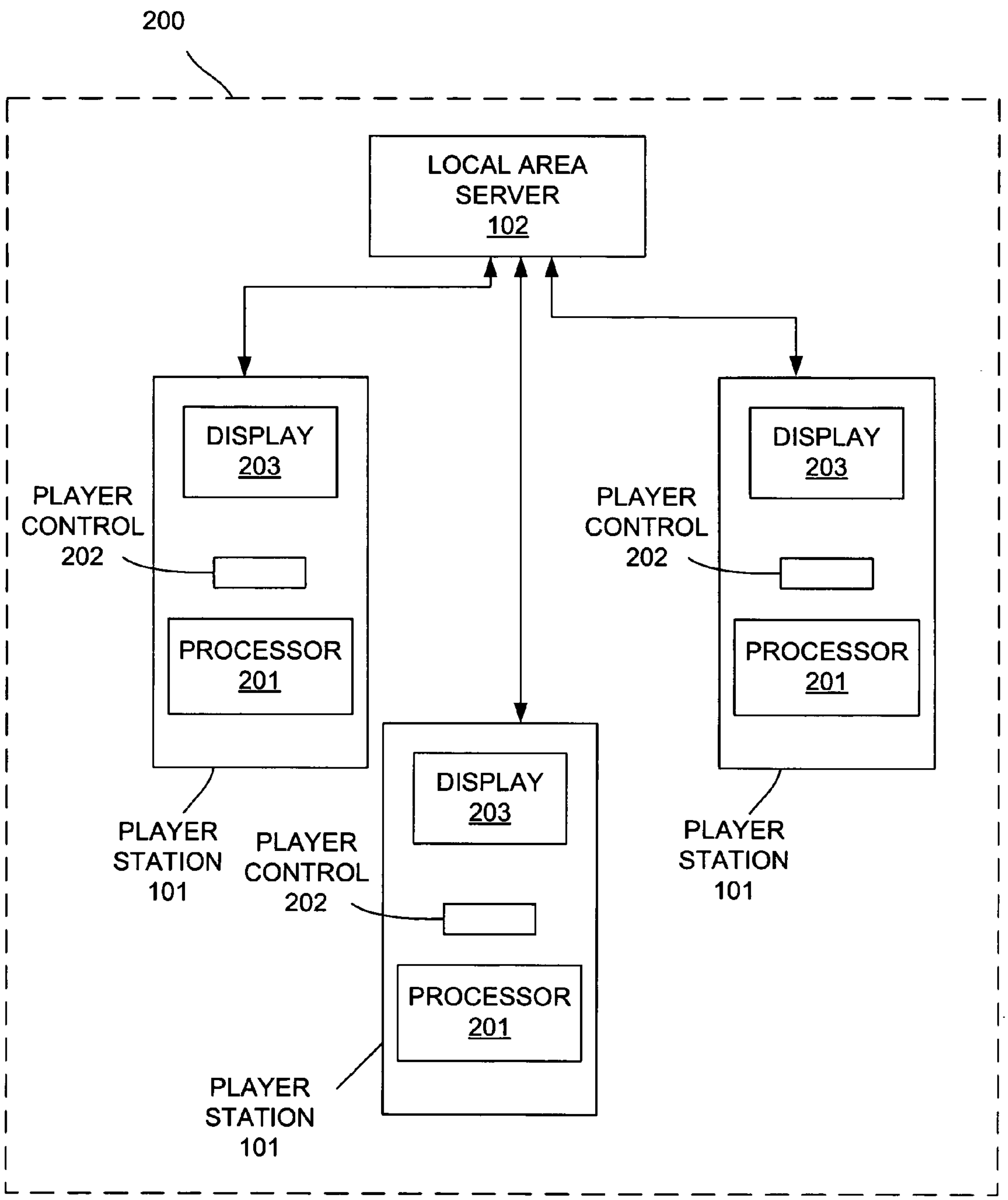
FIG. 2 is a more detailed diagrammatic representation of one of the gaming sites shown in FIG. 1.

FIG. 2 provides a more detailed diagrammatic representation of a group of player stations 101 communicating with a local area server 102 to form a gaming site 200. Gaming site 200, which may comprise a casino or other gaming facility, includes a local area server 102 communicating with three player stations 101. It will be appreciated that FIG. 2 is limited to just three player stations 101 just for purposes of example and that the invention is not limited to any particular number of player stations 101 per gaming site. Each of the player stations 101 shown in FIG. 2 includes a processor 201, a player control arrangement 202, and a display 203. Although not shown separately in the drawing, processor 201 may be associated with volatile and nonvolatile memory and a communications interface. The data storage associated with processor 201 in a respective player station 101 preferably stores computer program code that may be executed by the processor 201 to perform or direct the various functions provided by the player station 101. In particular, processor 201 will receive various player inputs from player control arrangement 202 associated with the respective player station 101, and will direct the respective display 203 to generate or produce graphics in the course of play in both the primary game and secondary game.

Player control arrangement 202 may include any type of input arrangement including one or more push buttons, keys, or lever activated switches. Also, the player control arrangement 202 may include a touch screen associated with display 203, and may thus be integrated with the display. Display 203 includes at least one video monitor/display such as a CRT, LCD, plasma, or other display device for displaying graphics in the course of game play. Some player stations may use two or more display devices for display 203. The graphics shown at display 203 may facilitate or prompt various player inputs through player control arrangement 202 and may present game results to the respective player.

It will be appreciated that FIG. 2 provides only a very diagrammatic representation of each player station 101 and does not show many elements that may be included in a player station 101. The system shown in FIG. 2 is limited generally to show just the elements necessary or helpful in describing the present invention. Further elements that may be included in an actual player station are not shown so as not to obscure the present invention in unnecessary detail. It will also be appreciated that the player stations included in a gaming system according to the invention need not be identical throughout the gaming system. Rather, there may be wide variations in the various components included in each player station 101 in addition to wide variations in the manner in which the player stations operate and wide variations in the game presentations provided through the player stations.

Examples of additional components that may be included with a player station 101 include one or more separate graphic processors for driving display 203, a sound system for providing high quality audio output at the player station 101, and a visual alerting device such as a light mounted at the top of the player station. In addition to or in lieu of display 203, a player station within the scope of the invention may also include a mechanical arrangement for displaying results such as one or more spinnable reels or wheels. Also, those familiar with gaming machines will appreciate that each player station may include a device or arrangement of devices for accepting currency, tokens, and/or vouchers, and a device or arrangement of devices for dispensing currency, tokens, and/or vouchers as winnings. In yet other arrangements, wagers and winnings may be tracked through a suitable player account arrangement included in the respective gaming network in which a player station is included, such as the player account arrangement disclosed in U.S. patent application publication 2002-0132666-A1. Of course, any appropriate device for receiving and issuing value in games played according to the present invention may be used, and the device may even be completely separate from the player station 101.

Figure 3:
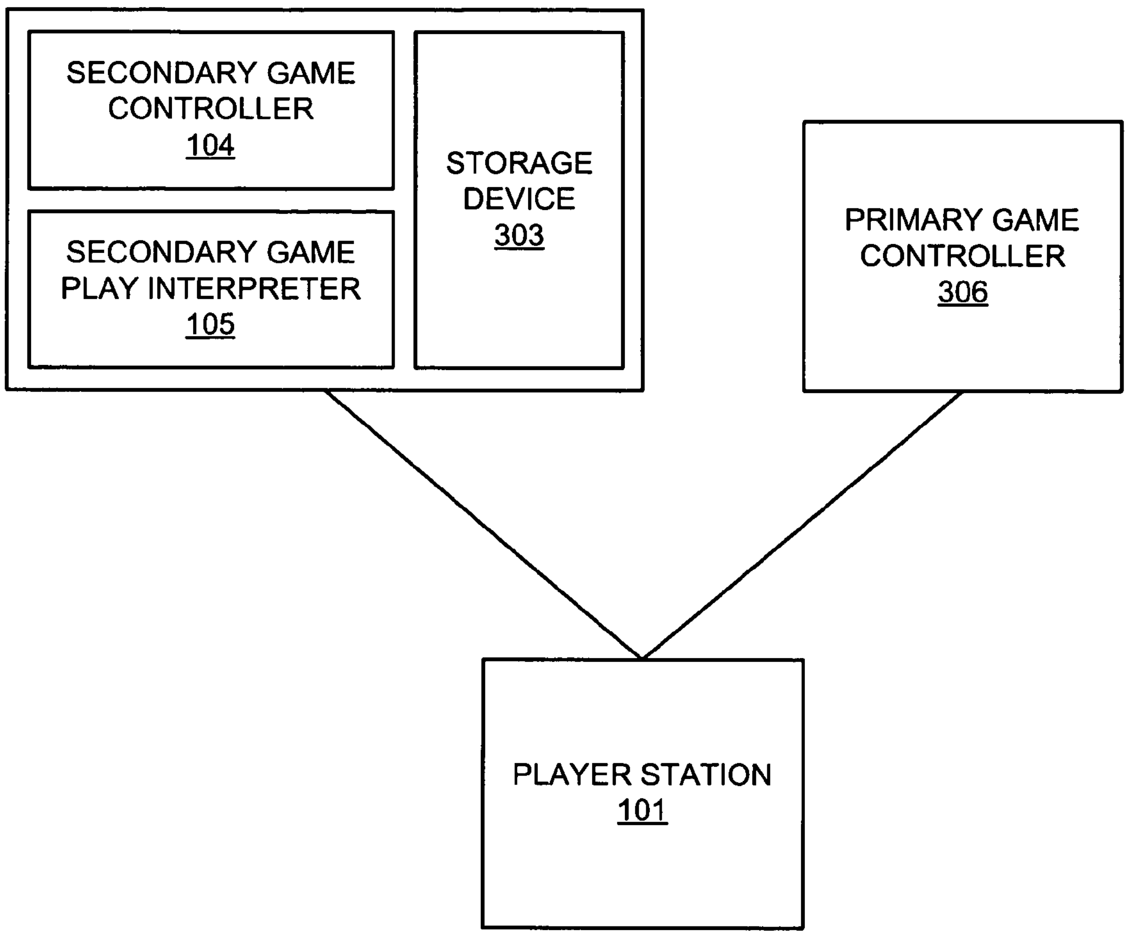
FIG. 3 is a more detailed diagrammatic view showing the secondary game controller of FIG. 1 together with cooperating elements in the gaming system.

FIG. 3 shows further details of one form of gaming system according to the invention. As indicated in FIG. 3, one preferred gaming system according to the invention includes a primary game controller 306 in addition to secondary game controller 104 and secondary game play interpreter 105. Primary game controller 306 helps implement a primary game that is conducted concurrently with the secondary game, and results in both games may be presented at player station 101. In particular, primary game controller 306 provides a result in the primary game in response to a game play input at player station 101. Player station 101 provides the interface for the player through which the player may enter a game play input in the primary game, and through which the primary and secondary game results may be presented to the player.

The example secondary game controller 104 shown in FIG. 3 is associated with a storage device 303 in addition to secondary game play interpreter 105. Storage device 303 may comprise a hard drive, random access memory, or other suitable data storage arrangement for storing a pool of ticket records. The pool of ticket records preferably includes a suitable number of individual ticket records which each represent an entry in the secondary game. In this preferred form of the invention, secondary game controller 104 generates a respective secondary game play by assigning respective ticket records from the pool of ticket records. The number of entries/ticket records assigned for a given secondary game play is determined by the wager specified in the primary game. For example, a ticket record from the pool of ticket records may be assigned for each predefined number of credits included in a wager in the primary game. A ticket record may be assigned for each credit in a wager, every two credits, every five credits, or every ten credits in a wager, for example. The number of entries/ticket records assigned to the various secondary game plays generated by secondary game controller 104 is preferably consistent across all of the wagers placed in the primary game or primary games available in a given gaming network or group of player stations offering the secondary game.

The pool of ticket records utilized in some forms of the invention may be stored in any suitable fashion to facilitate the desired assignment of ticket records for secondary game plays. Also, each ticket record itself may have any suitable structure. One preferred form of the invention utilizes a ticket record pool in the form of a data file with a separate entry for each ticket record. The ticket record making up a respective file entry may include a record identifier which is unique to that particular entry and an outcome for that particular ticket record. The outcome may be expressed as a numerical value representing a number of credits or units of currency, or may comprise an index value which is correlated to a prize/prize value in some fashion. For example, each respective index value may be correlated to a respective prize/prize value through an index value file. Such an index value file may have an entry for each index value that may be included in a secondary game ticket record pool, with each entry also including the prize/prize value to which the respective index value correlates, and also possibly information on graphics to be displayed at a player station 101 to show the secondary game result to the player. This type of index value table and arrangement is shown in U.S. Pat. No. 6,733,385, the entire content of which is incorporated herein by this reference. It will be appreciated that some forms of the invention may include information in addition to the ticket record identifier and outcome indicator. The invention encompasses substantially any ticket record pool and ticket record structure that facilitates assignment of ticket records to secondary game plays according to the invention.

The ticket record pool used in some preferred forms of the invention may be created in any suitable manner and using any suitable device. For example, a ticket record pool may be generated with a given pool structure in terms of the number of ticket records at each different outcome level in the pool, and the pool may then be randomized to randomize the position of each ticket record in the pool. Alternatively, the position of each ticket record in the pool may not be randomized. In some preferred forms of the invention, secondary game controller 104 is responsible for generating each ticket record pool used according to the invention. Other forms of the invention may include a separate component for generating ticket record pools for use by the secondary game controller or controllers 104 included in the gaming system. In any event, a new ticket record pool may be generated as necessary or desirable for use in the present gaming system. Generating a new ticket record pool may involve merely further randomizing (or re-randomizing) the ticket records in the pool, or creating a new pool from a pool definition which defines the number of winning ticket records and the prizes associated with those ticket records, and also defines the number of ticket records to be included in the pool that are not associated with any prize (that is, losing ticket records).

In forms of the invention utilizing a ticket record pool from which ticket records are assigned for a secondary game play, secondary game controller 104 may assign ticket records from the pool in any suitable manner to ensure a substantially random assignment of ticket records. For example, each ticket record may be associated with a sequence number in the pool and secondary game controller 104 may use a random number generator or pseudo random number generator to identify a given record to be assigned by its sequence number. Continuing with this example, a ticket record pool may have ticket records numbered sequentially from record one to the final ticket record in the pool. To assign a ticket record from the pool, secondary game controller 104 may generate a random or pseudo random number between one and the number corresponding to the final ticket record in the pool, and then assign the ticket record having the sequence number corresponding to the generated random or pseudo random number. The ticket record assignment operation may be identical for each primary game play input for which a secondary game play is produced. That is, the component responsible for assigning ticket records assigns records from the entire ticket record pool for each secondary game play. Other forms of the invention may, however, treat the ticket record pool similarly to a lottery ticket record pool and may allow the ticket record pool to become depleted of available ticket records as ticket records are assigned for secondary game plays.

It should be appreciated that the present invention is not limited to embodiments in which a ticket record pool is stored at storage device 303 and the secondary game controller assigns ticket records from this ticket record pool. Other forms of the invention may use an algorithm or any other suitable arrangement or technique to generate the entries in the secondary game to be assigned to a given secondary game play. The algorithm or other arrangement may be constructed so that it produces the desired prize distribution for the secondary game. Such a prize distribution may dictate, for example, that one in some number of entries in the secondary game may be associated with a win at a certain level in the secondary game.

Regardless of how secondary game controller 104 generates the secondary game plays including the one or more secondary game entries, each secondary game play is correlated with the primary game play input for which the secondary game play is generated. This correlation may be done in any suitable manner and allows the results associated with the secondary game play to be communicated back to the correct player station. Some preferred forms of the invention may associate each secondary game play with a player station identifier and a primary game play input identifier through one or more suitable data structures.

The preferred form of the invention shown in FIG. 3 employs secondary game play interpreter 105 to interpret the secondary game play generated by the secondary game controller so as to identify the result associated with the secondary game play. In one preferred form of the invention, secondary game play interpreter 105 analyzes each entry included in a secondary game play to identify a respective outcome for each entry, and then identifies an overall outcome for the secondary game play. For example, a given secondary game play may include ten entries in the secondary game and an outcome for each entry. In this example, secondary game play interpreter 105 reads each outcome and may add the outcomes together in a suitable fashion. This sum of individual outcomes represents the overall outcome of the secondary game play in this example. In other forms of the invention, secondary game play interpreter 105 may not generate an overall result for the secondary game play, but may simply read the individual secondary game play entries so that the outcomes associated with those entries may be presented to the player individually through player station 101. In yet other forms of the invention, secondary game play interpreter 105 may identify the highest value outcome among the entries in a given secondary game play and set that value as the overall result for the secondary game play. In any event, it is preferably secondary game play interpreter 105 which communicates secondary game play results to player station 101 for presentation to the player. This communication may identify the secondary game result in any suitable fashion such as with one or more result index values or prize values for example.

It will be appreciated that the arrangement shown in FIG. 3 is illustrated simply as an example structure through which the invention may be implemented. Although elements 104, 105, 303, and 306 are shown in FIG. 3 as being separate from player station 101, one or more of the other devices may be implemented at a player station used in the present invention. For example, a player station 101 may implement a primary game controller 306 through a processing device associated with the player station. Some forms of the invention may even implement secondary game controller 104, storage device 303, secondary game play interpreter 105, and primary controller 306 through devices included at a given player station 101. In this arrangement, it will be noted that a gaming system according to the invention may in fact include multiple secondary game controllers 104, primary game controllers 306, secondary game play interpreters 105 and storage devices 303, one each for each respective player station 101. Where the secondary game controller 104 assigns ticket records from a pool of such records to generate the secondary game plays as discussed above, each secondary game controller may assign ticket records from a separate respective pool of records. However, the ticket record pools may be generated and ticket records assigned according to the same rules and conditions so the results in the secondary game at each player station will be the same as if all assigned for each player station from a single ticket record pool.

Although each player station 101 may implement a respective secondary game controller 104 and secondary game play interpreter 105, the present invention has particular application in gaming systems employing centralized data processing devices as indicated in FIGS. 1 and 2 above. In these architectures, it is convenient to implement secondary game controller 104, secondary game play interpreter 105, and storage device 303 at one of the central processing devices or an entirely separate central processing device as shown in FIG. 1. The single arrangement of secondary game controller 104, secondary game play interpreter 105, and storage device 303 can perform the identical functions for each player station 101 included in the gaming system.

Where secondary game controller 104, secondary game play interpreter 105, and primary game controller 306 are implemented through general purpose processing devices, the various functions performed by those components will be directed by computer program code executed by the various devices. In particular, the functions performed by secondary game controller 104 will be performed under the control of secondary game program code executed by the respective data processing device or devices. Functions performed by primary game controller 306 will be performed under the control of primary game program code executed by the respective data processing device. Also, function performed by secondary game play interpreter 105 will be performed under the control of secondary game play interpreter program code. The invention is not limited to any particular type of program code or development environments for generating the program code. Also, it should be appreciated that the invention is not limited to implementation with general purpose processing devices operating under the control of program code. Rather, the various controllers employed in the invention may be implemented as special purpose processors that are hard-wired to perform the required functions and operations according to the invention.

Figure 4:
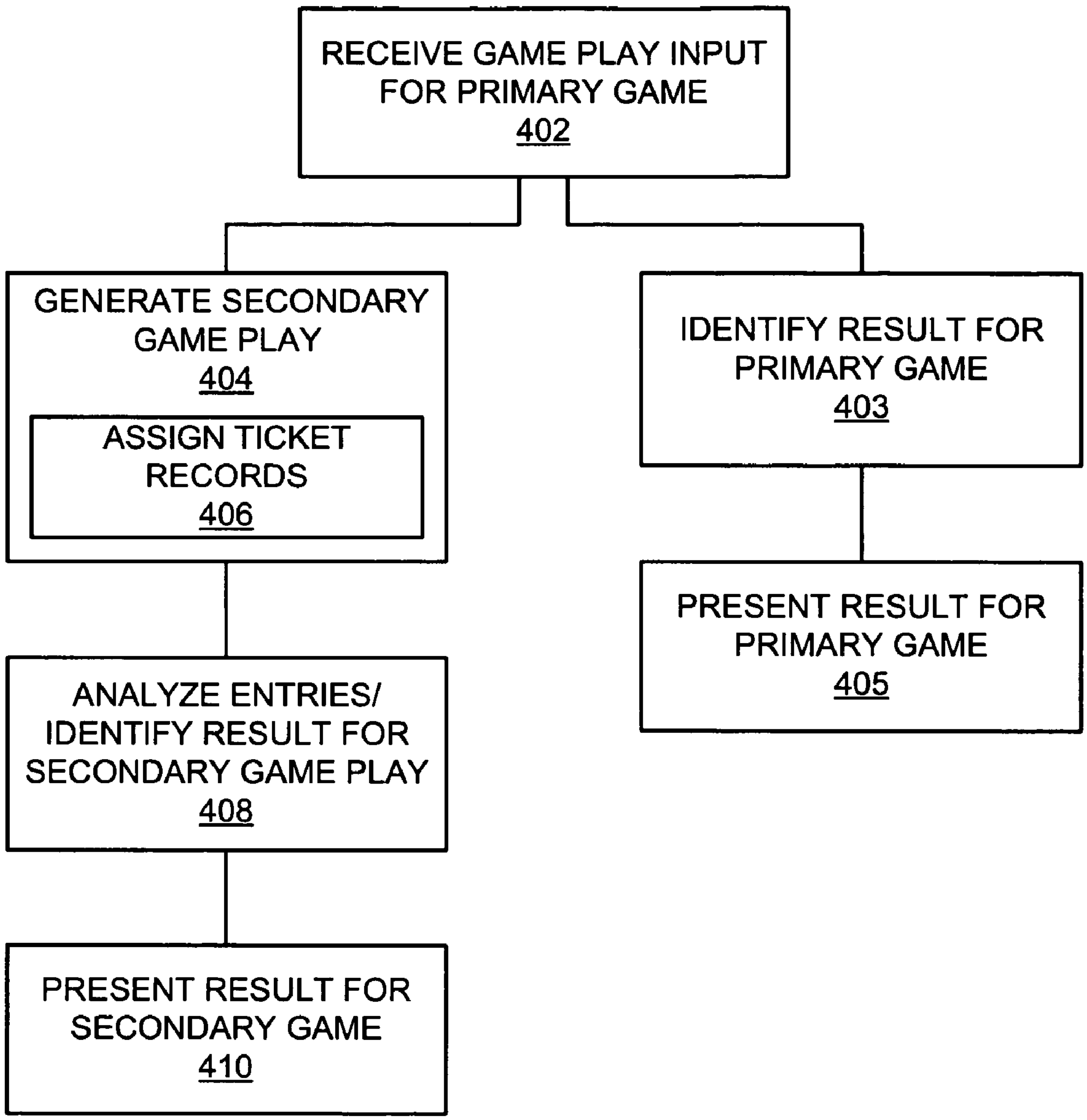
FIG. 4 is a flow diagram illustrating a gaming method embodying the principles of the present invention.

FIG. 4 provides a flowchart showing a single game cycle according to one preferred form of the invention. After receiving a game play input in the primary game as shown at process block 402 in FIG. 4, the process proceeds in two parallel tracks. One track is for the primary game and is shown on the right hand side of FIG. 4, and the other track is for the secondary game and is shown on the left hand side of FIG. 4. For the primary game, the process includes identifying a result for the primary game as shown at process block 403 in FIG. 4 and then presenting results for the primary game as shown at process block 405. For the secondary game, the process includes generating the secondary game play as shown at process block 404, which may include assigning ticket records as shown at process block 406. Regardless of how the secondary game play is generated at process block 404, the secondary game process includes identifying the result for the secondary game play as shown at process block 408, and then presenting the result for the secondary game as shown at process block 410.

The game play input for the primary game, which is received as show at process block 402 in FIG. 4, may be received in any number of fashions within the scope of the invention. In most preferred forms of the invention the game play input for the primary game represents one or more inputs received at a player station 101 in response to a player's operation of player controls at the player station, such as player controls 202 shown in FIG. 2. In some forms of the invention the player may be required to first make a wager input and then a separate play initiating input to submit the wager in the primary game. In other forms of the invention, a player may be required to make only one input through the player station player controls, and this single input will represent a primary game input according to the present invention. Regardless of what types of player control operations are required to make a primary game play input, the player station processor 101 (in FIGS. 1-3) responds to the signals from the player controls to produce suitable communications to the other components in the system. In particular, the player station processor 101 communicates with the primary game controller 306 and secondary game controller 104 shown in FIG. 3. The information communicated to secondary game controller 104 in response to a game play input received as shown at process block 402 will include in most forms of the present invention either the wager specified in the game play input or some data that correlates to the wager for the game play input. This wager information is required by the secondary game controller in order for it to determine the appropriate number of entries in the secondary game to include in the respective secondary game play that will be generated in response for the game play input in the primary game. The communication sent to primary game controller 105 in response to the game play input received as indicated at process block 402 will depend upon the nature of the primary game. The communication may or may not include the wager associated with the game play input, may include a bingo card identifier or definition where the primary game comprises a bingo game, or may include simply a request for a result for other types of primary games.

The process of identifying the result for the primary game as shown at process block 403 will depend upon the nature of the primary game. A beneficial aspect of the present invention is that the application of the secondary game to a given primary game is open to any type of primary game, including traditional casino games such as mechanical and video reel-type slot games, lottery games, bingo games, card games, keno, or any other type of game. The secondary game according to the invention may also be employed in connection with any particular type of game presentation used in the primary game. The precise manner in which a result is identified in the primary game is not relevant to the present invention. In fact, it is not necessary for the present invention to identify a result in the primary game, although such a result will typically be identified in implementations of the present invention.

The present invention is not limited by any particular manner for presenting the primary game result as indicated at process block 405 in FIG. 4. Typically, however, the process for presenting the primary game result will depend at least in part upon the nature of the primary game. For example, where the primary game comprises a bingo game, the presentation of the primary game result may include displaying the player's bingo card or cards and a flash board indicating the bingo designations drawn for the bingo game. In any event, the process of presenting the result in the primary game will typically include producing some graphic display or sequence of graphic displays at a display device such as device 203 associated with a player station 101 as shown in FIG. 2. The primary game result presentation process will also typically include awarding some prize to the player if a prize is associated with the primary game result.

The process of generating the secondary game play as indicated at process block 404 in FIG. 4 is preferably performed by a processing device such as secondary game controller 104 discussed above in connection with FIGS. 1 and 3. The secondary game play generation process will encompass including one or more secondary game entries in the secondary game play. This secondary game entry assignment process may include assigning ticket records as indicated at process block 406 in FIG. 4 and as discussed above in connection with FIG. 3 and the operation of secondary game controller 104. Also as discussed above in connection with FIG. 3, the number of entries included in the secondary game play is determined by the wager made in the primary game as specified with the game play input received a process block 402. This determination of the number of entries based upon the wager specified in the primary game play input will apply regardless of how the entries in the secondary game are assigned for a given secondary game play.

Some forms of the present invention may not include generating a secondary game play for each game play input in a primary game. For example, generation of a secondary game play could be limited to occur only when a minimum wager amount is met or exceeded in the primary game. Alternatively, the secondary game may be invoked only at particular times. For example, when participation of primary games in a given network drops below some level, the secondary game may be announced and conducted for each primary game play input for a limited time in order to encourage player participation in the primary game or games.

The process identifying the result for the secondary game play as indicated process block 408 in FIG. 4 is preferably performed by secondary game play interpreter 105 shown in FIGS. 1 and 3. As discussed above in connection with FIG. 3, the process of identifying the result for the secondary game play may involve analyzing the individual entries assigned or included in the secondary game play and then determining the result based on that analysis. Different variations on this process are described above in connection with the operation of secondary game play interpreter 105.

The step of presenting the result for the secondary game as indicated at process block 410 in FIG. 4 is subject to wide variation within the scope of the present invention. As with presenting a primary game result, presenting the result for the secondary cable typically includes producing some graphic display or sequence of graphic displays through a display device such as display device 203 at a player station 101 shown in FIG. 2, and will also include awarding any prize associated with the secondary game result. It should be noted that the present invention does not require presenting a secondary game result for each primary game play input received as shown at process block 402. Rather, some forms of the invention present the result for the secondary game only if there is some winning outcome associated with the result. That is, if every secondary game entry in a given secondary game play is associated with a losing result (no payout), then the negative secondary game result may not be presented to the player. Also, the secondary game result may be presented as if it were a primary game result, or at least using the same graphics used to display primary game results. In fact, some forms of invention may include actually combining the result for the secondary game with the result for the primary game so that both results are presented in a single step as a combined result. In these forms of invention, the player may not be aware that they are actually receiving a result in a secondary game. Also, in these forms of the invention the pay tables for the primary game may be required to include levels that represent combinations of prizes available in the secondary game with prizes available in the primary game. In yet other forms of the invention, a separate graphic display may be generated at a display device (such as display device 203 in FIG. 2) to show the secondary game result either has a bonus or some other additional graphic display in addition to the graphic display used for the primary game. It should further be noted that even winning secondary game results need not be displayed in association with a particular primary game play input. For example, winning secondary game play results may be reported every fifth game play of the primary game, or at the end of a gaming session at a player station.

Because there are preferably prizes associated with some of the secondary game plays generated according to the present invention, and those prizes may be presented/awarded to a player as indicated at process block 410 in FIG. 4, a gaming system implementing a secondary game as disclosed herein will use some arrangement for finding the prizes that may be awarded in the secondary game. Any suitable arrangement may be used for funding the prizes that may be awarded in a secondary game implemented according to the present invention. Ultimately, the prizes should be funded from the take in the primary game or games with which the secondary game is played, although other arrangements are possible. In one preferred form of the invention, a gaming network operator may set the prizes that may be awarded in the secondary game and the odds of winning the various prizes so that over a sufficiently long period of play in the primary game(s) and secondary game, the take in the primary game(s) will be sufficient to fund the potential secondary game prizes and still leave an appropriate amount of take for the network operator's profit and for the casino owner's/operator's profit. In other forms of the invention, the secondary game may be operated as a progressive game with a percentage of each wager being set aside to fund a secondary game prize pool. In this progressive game arrangement, the prizes in the secondary game may not be fixed prizes, but may be determined by the value of the progressive prize pool at the time of a win in the secondary game. It should be noted, however, that the progressive prize pool for the secondary game prizes is funded by a percentage of wagers made in a different game, namely the primary game or games through which the secondary game is offered.

As used herein, whether in the above description or the following claims, the terms "comprising," "including," "carrying," "having," "containing," "involving," and the like are to be understood to be open-ended, that is, to mean including but not limited to. Only the transitional phrases "consisting of" and "consisting essentially of," respectively, shall be closed or semi-closed transitional phrases, as set forth, with respect to claims, in the United States Patent Office Manual of Patent Examining Procedures (Eighth Edition, August 2001 as revised May 2004), Section 2111.03.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The above described preferred embodiments are intended to illustrate the principles of the invention, but not to limit the scope of the invention. Various other embodiments and modifications to these preferred embodiments may be made by those skilled in the art without departing from the scope of the invention.

The invention claimed is:

1. A method including:

(a) receiving a first game play input in a gaming network, wherein
  (i) the gaming network comprises a number of electronic player stations connected for communication with a secondary game controller, each electronic player station displaying a game presentation corresponding to a respective primary game,
  (ii) the first game play input specifies a wager in a respective primary game;
(b) causing the secondary game controller to generate a first secondary game play for a secondary game in response to the first game play input, wherein
  (i) the first secondary game play is correlated with the first game play input,
  (ii) the first secondary game play includes one or more entries in the secondary game, the secondary game being distinct from the each primary game,
  (iii) the number of entries included in the first secondary game play is determined by the wager specified by the first game play input,
  (iv) generating the first secondary game play includes assigning a respective ticket record for each respective entry included in the first secondary game play, each respective ticket record assigned for the first secondary game play including a record identifier and an outcome for that respective ticket record;
(c) analyzing each ticket record for each entry included in the first secondary game play to identify a result of the first secondary game play in the secondary game;
(d) receiving a subsequent game play input in the gaming network, wherein the subsequent game play input specifies a wager in a respective primary game;
(e) causing the secondary game controller to generate a subsequent secondary game play for the secondary game in response to the additional game input, wherein
  (i) the subsequent secondary game play is correlated with the subsequent game play input,
  (ii) the subsequent secondary game play includes one or more entries in the secondary game, and
  (iii) the number of entries included in the subsequent secondary game play is determined by the wager specified by the subsequent game play input;
  (iv) generating the subsequent secondary game play includes assigning a respective ticket record for each respective entry included in the subsequent secondary game play, each respective ticket record assigned for the subsequent secondary game play including a record identifier and an outcome for that respective ticket record;
(f) analyzing each ticket record for each entry included in the subsequent secondary game play to identify a result of the subsequent secondary game play in the secondary game;
(g) in response to the first game play input, producing a first result display at the respective electronic player station through which the first game play input was received, the first result display showing a result in the respective primary game for which the first game play input was received and showing the result identified for the first secondary game play; and
(h) in response to the subsequent game play input, producing a subsequent result display at the respective electronic player station through which the subsequent game play input was received, the subsequent result display showing a result in the respective primary game for which the subsequent game play input was received and showing the result identified for the subsequent secondary game play.

2. The method of claim 1 wherein the first secondary game play and the subsequent secondary game play are each generated also in response to a level of participation in a number of primary games available in the gaming network.

3. The method of claim 1, wherein the first primary game is a game in which a result is determined locally at the respective player station at which the first primary game is displayed, and the second primary game is a game in which a result is determined at a server in communication with multiple player stations at which the second primary game is displayed.

4. The method of claim 3, wherein the first primary game is a slot or reel-type game, and the second primary game is a bingo or keno game.

5. The method of claim 1, wherein the gaming network comprises one or more separate gaming networks related only by the secondary game, a first one of the separate gaming networks comprising a number of electronic player stations connected for communication with each other and offering the first primary game, and wherein one or more of the remaining electronic player stations in the gaming network offer the second primary game.

6. The method of claim 1, wherein the gaming network comprises one or more separate gaming networks related only by the secondary game, the electronic player stations within a first one of the separate gaming networks offer a game for which a result is determined by a server computer in communication with each player station within that separate gaming network, and one or more of the remaining electronic player stations in the gaming network offer a game for which a result is determined locally at the player station.

7. A method including:

(a) receiving a first game play input in a gaming network, wherein
  (i) the gaming network comprises a number of electronic player stations connected for communication with a secondary game controller, each electronic player station displaying a game presentation corresponding to a first primary game or a second primary game, the first primary game being a different type of game from the second primary game, and
  (ii) the first game play input specifies a wager in the first primary game;
(b) causing the secondary game controller to generate a first secondary game play for a secondary game in response to the first game play input, wherein
  (i) the first secondary game play is correlated with the first game play input,
  (ii) the first secondary game play includes one or more entries in the secondary game, the secondary game being distinct from the first primary game and the second primary game, (iii) the number of entries included in the first secondary game play is determined by the wager in the respective primary game, (iv) generating the first secondary game play includes assigning a respective ticket record, including a record identifier and an outcome for that respective ticket record, for each respective entry included in the first secondary game play, each respective ticket record being assigned from a pool of ticket records, (c) analyzing each ticket record for each entry included in the first secondary game play to identify a result of the first secondary game play in the secondary game;

(d) receiving a subsequent game play input in the gaming network, wherein the subsequent game play input specifies a wager in the second primary game;

(e) causing the secondary game controller to generate a subsequent secondary game play for the secondary game in response to the additional game input, wherein (i) the subsequent secondary game play is correlated with the subsequent game play input, (ii) the subsequent secondary game play includes one or more entries in the secondary game, (iii) the number of entries included in the subsequent secondary game play is determined by the wager in the respective primary game, (iv) generating the subsequent secondary game play includes assigning a respective ticket record, including a record identifier and an outcome for that respective ticket record, for each respective entry included in the subsequent secondary game play, each respective ticket record being assigned from a pool of ticket records;

(f) analyzing each ticket record for each entry included in the subsequent secondary game play to identify a result of the subsequent secondary game play in the secondary game;

(g) in response to the first game play input, displaying a result in the first primary game and the result of the first secondary game play at a player station through which the first game play input was received; and (h) in response to the subsequent game play input, displaying a result in the second primary game and the result of the subsequent secondary game play at a player station through which the subsequent game play input was received.

8. A gaming system including:

(a) a number of electronic player stations, each respective electronic player station including a respective display arrangement and being configured to receive a respective game play input and associated wager in either a first primary game or a second primary game;

(b) a secondary game controller, wherein (i) the secondary game controller is connected for communication with the electronic player stations, (ii) the secondary game controller is adapted to generate a first secondary game play for a secondary game in response to a first game play input, the first secondary game play being correlated with the first game play input, the first secondary game play including one or more entries in the secondary game, the secondary game being distinct from the first primary game and the second primary game, and the number of entries included in the first secondary game play being determined by the wager in the respective primary game, (iii) the secondary game controller is further adapted to generate a subsequent secondary game play for the secondary game in response to a subsequent game play input, the subsequent secondary game play being correlated with the subsequent game play input, the subsequent secondary game play including one or more entries in the secondary game, and the number of entries in the subsequent secondary game play being determined by a wager in the second primary game, (iv) generating the first secondary game play and the subsequent secondary game play includes assigning a respective ticket record for each respective entry included in the respective secondary game play, each respective assigned ticket record including a record identifier and an outcome for that respective ticket record;

(c) a secondary game play interpreter for analyzing each ticket record for each entry included in the first secondary game play and subsequent secondary game play to identify a result of the first secondary game play and the subsequent secondary game play, respectively; and (d) wherein the display arrangement of the player station at which the first game play input is received is configured to, in response to the first game play input, display a result in the respective primary game for which the first game play input was received and display the result of the first secondary game play, and wherein the display arrangement of the player station at which the subsequent game play input is received is configured to, in response to the subsequent game play input, display a result in the respective primary game for which the subsequent game play input was received and display the result of the subsequent secondary game play.

9. The gaming system of claim 8 further including a data storage device storing a pool of ticket records for the secondary game from which pool of ticket records the secondary game controller assigns the respective ticket records for the respective secondary game plays.

10. The gaming system of claim 8 wherein the first game play input is received at a first electronic player station and the subsequent game play input is received at a second electronic player station and the secondary game play interpreter is separate from both the first electronic player station and the second electronic player station.

11. A program product stored on at least one storage medium, the program product including:

(a) player station program code executable at each respective player station of a number of electronic player stations for causing the respective player station to receive a respective game play input and associated wager in a respective primary game;

(b) secondary game program code executable for causing a secondary game controller to (i) facilitate communications with the player stations, (ii) generate a first secondary game play for a secondary game in response to a first game play input received for a respective one of the primary games, the first secondary game play being correlated with the first game play input, the first secondary game play including one or more entries in the secondary game, the secondary game being distinct from the first primary game and the second primary game, and the number of entries included in the first secondary game play being determined by the wager in the respective primary game for which the first game play input was received, (iii) generate an subsequent secondary game play for the secondary game in response to a subsequent game play input received for a respective one of the primary games, the subsequent secondary game play being correlated with the subsequent game play input, the additional secondary game play including one or more entries in the secondary game, and the number of entries in the subsequent secondary game play being determined by a wager in the respective primary game for which the subsequent game play input was received, (iv) and wherein generating the first secondary game play and the subsequent secondary game play includes assigning a respective ticket record for each respective entry included in the respective secondary game play, each respective assigned ticket record including a record identifier and an outcome for that respective ticket identifier;

(c) secondary game play interpreter program code executable to analyze each ticket record for each entry included in the first secondary game play and subsequent secondary game play to identify a result of the first secondary game play and the subsequent secondary game play, respectively; and (d) wherein the player station program code is further executable to (i) cause the player station at which the first game play input was received to, in response to the first game play input, display a result in the respective primary game for which the first game play input was received and display the result of the first secondary game play, and to (ii) cause the player station at which the subsequent game play input was received to, in response to the subsequent game play input, display a result in the respective primary game for which the subsequent game play input was received and display the result of the subsequent secondary game play.

12. The program product of claim 11 wherein each respective ticket record is assigned from a pool of ticket records.

13. The program product of claim 12 wherein the secondary game program code is also executable for generating the pool of ticket records.

* * * * *

UNITED STATES PATENT AND TRADEMARK OFFICE

CERTIFICATE OF CORRECTION

PATENT NO. : 8,029,349 B2
APPLICATION NO. : 11/268322
DATED : October 4, 2011
INVENTOR(S) : Jefferson C. Lind It is certified that error appears in the above-identified patent and that said Letters Patent is hereby corrected as shown below:

At column 1, line 17: change “Modem gaming” to read --Modern gaming--.

At column 13, line 31: change “from the each primary” to read --from each primary--.

Signed and Sealed this
Seventeenth Day of January, 2012

David J. Kappos
*Director of the United States Patent and Trademark Office*